US012211415B2

(12) United States Patent
Bi

(10) Patent No.: US 12,211,415 B2
(45) Date of Patent: Jan. 28, 2025

(54) COMPENSATION METHOD OF PIXEL CIRCUIT AND DISPLAY PANEL

(71) Applicant: Shenzhen China Star Optoelectronics Semiconductor Display Technology Co., Ltd., Guangdong (CN)

(72) Inventor: Tao Bi, Guangdong (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/508,408

(22) Filed: Nov. 14, 2023

(65) Prior Publication Data

US 2024/0221577 A1 Jul. 4, 2024

(30) Foreign Application Priority Data

Dec. 30, 2022 (CN) ........................ 202211741315.2

(51) Int. Cl.
*G09G 3/20* (2006.01)

(52) U.S. Cl.
CPC ... *G09G 3/2007* (2013.01); *G09G 2320/0257* (2013.01); *G09G 2320/0285* (2013.01); *G09G 2320/041* (2013.01); *G09G 2320/045* (2013.01)

(58) Field of Classification Search
CPC .................................................... G09G 3/2007
See application file for complete search history.

(56) References Cited

U.S. PATENT DOCUMENTS

2022/0157223 A1* 5/2022 Wang ........................ G09G 3/32

* cited by examiner

*Primary Examiner* — Gustavo Polo
(74) *Attorney, Agent, or Firm* — PV IP PC; Wei Te Chung

(57) ABSTRACT

A compensation method a pixel circuit and a display panel are provided. In the compensation method, a gate potential and a source potential of a driving transistor in a writing stage are obtained and a compensation coefficient of the pixel circuit is determined, and then a light-emitting current flowing through the driving transistor in a light-emitting stage is determined based on the compensation coefficient, the gate potential and the source potential of the driving transistor in the writing stage. The compensation coefficient can adjust transmission loss of the gate potential and the source potential of the driving transistor in the writing stage, so as to ensure that the light-emitting current flowing through the driving transistor in the light-emitting stage is desired, without causing the phenomenon of shift in brightness.

8 Claims, 3 Drawing Sheets

COMPENSATION METHOD OF PIXEL CIRCUIT AND DISPLAY PANEL

CROSS-REFERENCE TO RELATED APPLICATION

This application claims the benefit of priority of Chinese Patent Application No. 202211741315.2, filed on Dec. 30, 2022, the disclosure of which is incorporated herein by reference in its entirety.

TECHNICAL FIELD

The present disclosure relates to a field of display technologies, and in particular, to compensation methods of pixel circuits and display panels.

DESCRIPTION OF RELATED ART

In a writing stage of a pixel circuit, a gate and a source of a driving transistor are respectively written with corresponding potentials respectively, so as to achieve a desired light-emitting effect. However, during the process of writing, transmission loss may occur, resulting in an undesirable light-emitting effect.

SUMMARY OF THE INVENTION

The present disclosure provides a compensation method of a pixel circuit and a display panel, so as to alleviate the technical problem of shift in brightness caused by transmission loss.

In a first aspect, the present disclosure provides a compensation method of a pixel circuit, which includes the following steps: constructing the pixel circuit including a driving transistor; acquiring a gate potential and a source potential of a driving transistor in a writing stage; determining a compensation coefficient of the pixel circuit; and determining a light-emitting current flowing through the driving transistor in a light-emitting stage based on the compensation coefficient and the gate potential and the source potential of the driving transistor in the writing stage.

In some embodiments, the step of determining the light-emitting current flowing through the driving transistor in the light-emitting stage based on the compensation coefficient and the gate potential and the source potential of the driving transistor in the writing stage includes: determining a gate-source potential difference of the driving transistor in the writing stage based on a difference between the gate potential and the source potential of the driving transistor in the writing stage; and determining a gate-source potential difference of the driving transistor in the light-emitting stage based on a product of the compensation coefficient and the gate-source potential difference of the driving transistor in the writing stage.

In some embodiments, the step of determining the light-emitting current flowing through the driving transistor in a light-emitting stage based on the compensation coefficient and the gate potential and the source potential of the driving transistor in the writing stage further includes: determining a constant of the driving transistor; acquiring a calculation result of a square of a difference between the gate-source potential difference of the driving transistor in the light-emitting stage and a threshold voltage of the driving transistor; and determining a multiplication result of multiplying the calculation result and the constant of the driving transistor as the light-emitting current that flows through the driving transistor in the light-emitting stage.

In some embodiments, the step of determining the compensation coefficient of the pixel circuit includes: acquiring a gate-source potential difference between the gate potential and the source potential of the driving transistor in the writing stage under different grayscale voltages; determining grayscale coefficients based on the gate-source potential difference under different grayscale voltages; and determining the grayscale coefficient as one of factors of the compensation coefficient.

In some embodiments, the step of determining the grayscale coefficient based on the gate-source potential difference under the different grayscale voltages further includes: determining a functional relationship between the grayscale coefficient and the gate-source potential difference in the writing stage according to a corresponding relationship between the gate-source potential difference in the writing stage and the light-emitting current that flows through the driving transistor in the light-emitting stage before compensation; and determining the grayscale coefficient according to the functional relationship and the gate-source potential difference in the writing stage.

In some embodiments, the step of determining the compensation coefficient of the pixel circuit further includes: determining row and column coordinates of the pixel circuit in a display panel; determining a position coefficient of the pixel circuit based on the row and column coordinates; and determining the position coefficient as one of the factors of the compensation coefficient.

In some embodiments, the step of determining the compensation coefficient of the pixel circuit further includes: determining a product of the position coefficient and the grayscale coefficient as the compensation coefficient.

In some embodiments, the compensation method further includes: obtaining a grayscale coefficient table for each grayscale voltage according to the grayscale coefficients of each pixel circuit under different grayscale voltages; and in response to the corresponding grayscale voltage, calling, by each pixel circuit, the grayscale coefficient table associated with the corresponding grayscale voltage.

In some embodiments, the compensation method further includes: obtaining a corresponding position coefficient table according to the position coefficient of each pixel circuit; and calling, by each pixel circuit, the position coefficient table in response to operation of each pixel circuit.

In a second aspect, the present disclosure provides a display panel, which implements the compensation method in at least one of the aforementioned embodiments.

According to the compensation method and the display panel of the pixel circuit provided by the present disclosure, the gate potential and the source potential of the driving transistor in the writing stage are obtained and the compensation coefficient of the pixel circuit is determined, and then the light-emitting current flowing through the driving transistor in the light-emitting stage is determined based on the compensation coefficient, the gate potential and the source potential of the driving transistor in the writing stage. The compensation coefficient can adjust transmission loss of the gate potential and the source potential of the driving transistor in the writing stage, so as to ensure that the light-emitting current flowing through the driving transistor in the light-emitting stage is desired, without causing the phenomenon of shift in brightness.

BRIEF DESCRIPTION OF THE DRAWINGS

Technical solutions and other beneficial effects of the present disclosure will be apparent from the following detailed description of specific embodiments of the present disclosure in conjunction with the accompanying drawings.

DETAILED DESCRIPTION OF SPECIFIC EMBODIMENTS OF THE INVENTION

Technical solutions in embodiments of the present disclosure will be described clearly and completely in conjunction with the accompanying drawings in the embodiments of the present disclosure. Apparently, the described embodiments are only some of the embodiments of the present disclosure, and not all of them. Based on the embodiments in the present disclosure, all other embodiments obtained by those skilled in the art without creative work will fall within the scope of protection of the present disclosure.

In addition, the terms "first" and "second" are only used for descriptive purposes, and cannot be understood as indicating or implying relative importance or implicitly indicating the number of indicated technical features, whereby the features limited by the terms "first" and "second" may explicitly or implicitly include one or more of the stated features. In the description of the present disclosure, "multiple" means two or more, unless otherwise specifically defined.

Figure 1:
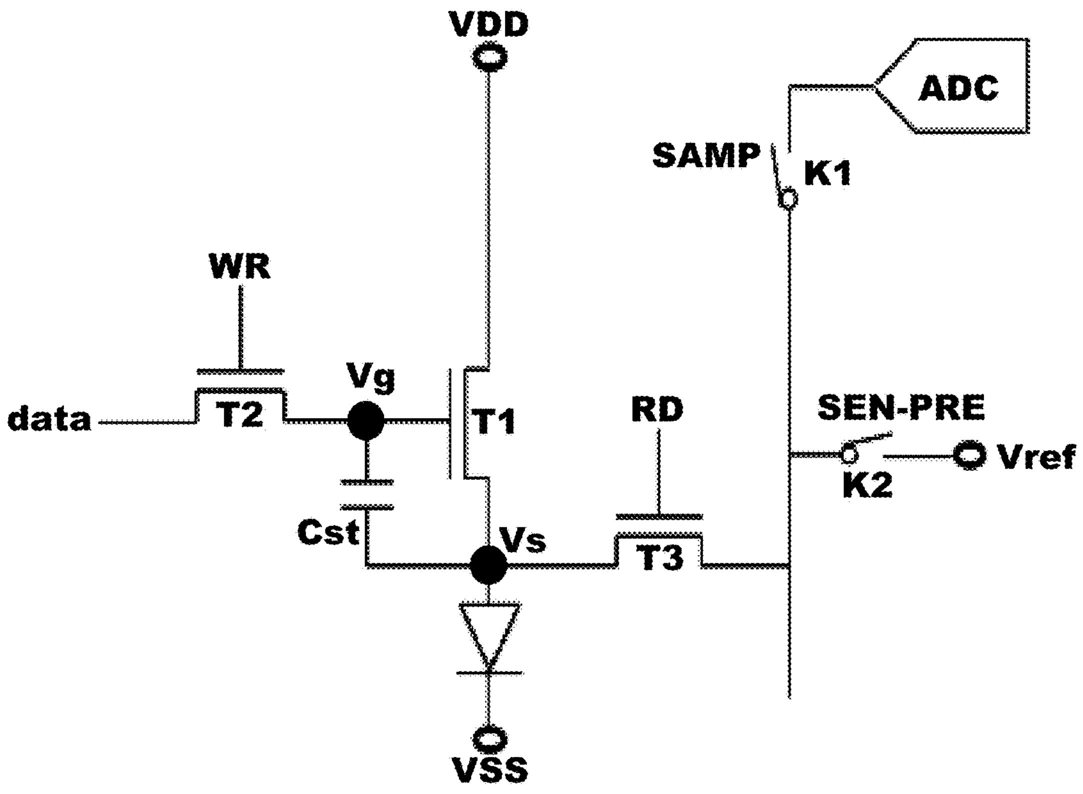
FIG. 1 illustrates a schematic structural view of a pixel circuit in the related art.

FIG. 1 illustrates a schematic structural view of a pixel circuit in the related art. As shown in FIG. 1, in the pixel circuit based on external compensation, a voltage Vg (also referred to as gate potential) and a voltage Vs (also referred to as source potential) are written at a gate and a source of a driving transistor T1 respectively at a writing stage.

Figure 2:
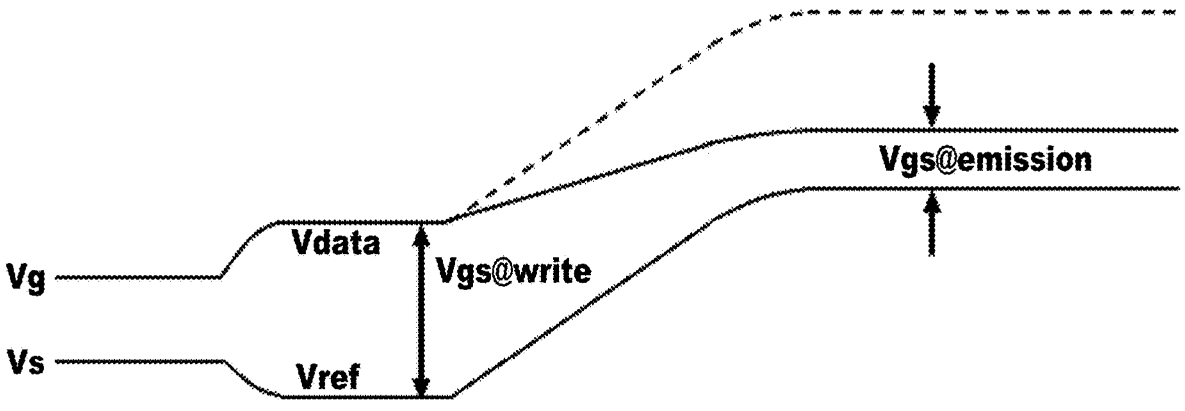
FIG. 2 illustrates a schematic view of transmission loss of a gate potential of a driving transistor in FIG. 1.

In this situation, a gate-source potential difference (Vg−Vs) of the driving transistor T1 in the writing stage is Vgs@write (Vdata−Vref) as shown in FIG. 2, and then the gate-source potential difference between the voltage Vg and the voltage Vs is jointly raised to Vgs@emission in the light-emitting stage (also referred to emission stage) due to the capacitive coupling effect. Specifically, Vdata represents a potential of a data signal data. Vref represents a potential of a reference signal Vref.

Under an ideal condition, Vgs@write should be equal to Vgs@emission. However, due to the unequal parasitic capacitances of the gate and the source, the gate potential (Vg) of the driving transistor T1 is not raised as shown by the dotted line in FIG. 2, but is raised as shown by the solid line in FIG. 2, which causes the gate potential of the driving transistor T1 to be raised at a lower rate than the source potential (Vs) of the driving transistor T1, resulting in a difference between an actual Vgs@emission and an ideal Vgs. This difference between the actual Vgs@emission and the ideal Vgs may cause the actual brightness of the light-emitting device to shift, resulting in poor display effect of the screen, serious uneven brightness (mura) and poor external compensation effect. Therefore, it is necessary to obtain a loss ratio of Vgs (Vgs@emission/Vgs@write) and compensate it, so as to alleviate the technical problem of a shift in brightness caused by transmission loss.

Figure 3:
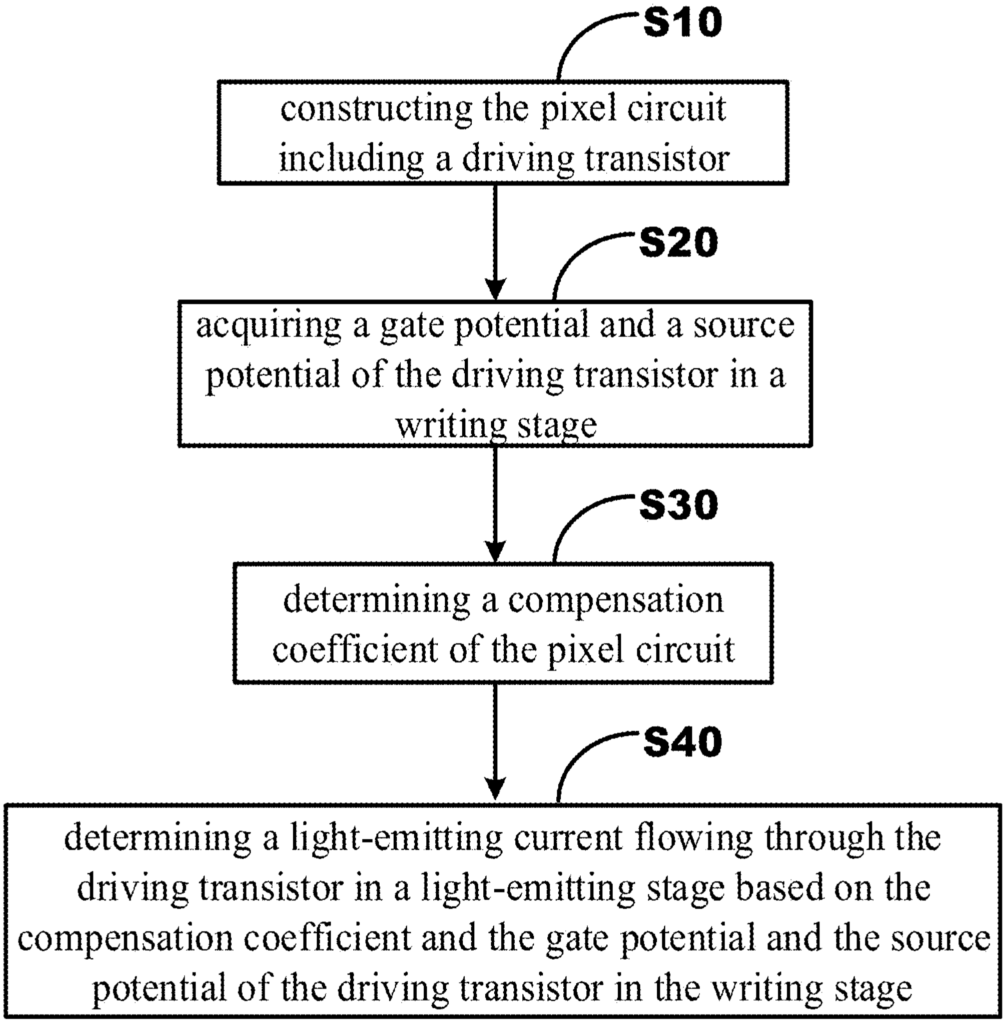
FIG. 3 illustrates a flowchart of a compensation method according to an embodiment of the present disclosure.

In view of the above-mentioned technical problem that the transmission loss of the data signal data causes the brightness to shift, an embodiment provides a compensation method of a pixel circuit, as shown in FIG. 1 to FIG. 5. Referring to FIG. 3, the compensation method includes the following steps:

S10: constructing the pixel circuit including a driving transistor;

S20: acquiring a gate potential and a source potential of the driving transistor in a writing stage;

S30: determining a compensation coefficient of the pixel circuit; and

S40: determining a light-emitting current flowing through the driving transistor in a light-emitting stage based on the compensation coefficient and the gate potential and the source potential of the driving transistor in the writing stage.

It can be understood that, according to the compensation method of the pixel circuit and the display panel provided by the embodiments, the gate potential and the source potential of the driving transistor T1 in the writing stage are obtained and the compensation coefficient $\alpha$ of the pixel circuit is determined, and then the light-emitting current flowing through the driving transistor T1 in the light-emitting stage is determined based on the compensation coefficient $\alpha$, the gate potential and the source potential of the driving transistor T1 in the writing stage. The compensation coefficient $\alpha$ can adjust transmission loss of the gate potential and the source potential of the driving transistor T1 in the writing stage, so as to ensure that the light-emitting current flowing through the driving transistor T1 in the light-emitting stage is desired, without causing the phenomenon of shift in brightness.

It should be noted that a drain of the driving transistor T1 may be connected to a positive power line. The positive power line is used to transmit a positive power signal VDD. The steps S20 and S30 may be performed in any order, or may be performed simultaneously.

As shown in FIG. 1, the pixel circuit may further include a writing transistor T2, one of a source or a drain of the writing transistor T2 is connected to a data line, the other of the source or the drain of the writing transistor T2 is connected to the gate of the driving transistor T1, and a gate of the writing transistor T2 is connected to a scanning line.

Specifically, the data line is used to transmit the data signal data. The scanning line is used to transmit a scanning signal WR.

The pixel circuit may further include a storage capacitor Cst, one end of the storage capacitor Cst is connected to the gate of the driving transistor T1, and the other end of the storage capacitor Cst is connected to the source of the driving transistor T1.

The pixel circuit may further include a light emitting device, an anode of the light emitting device is connected to the source of the driving transistor T1, and a cathode of the light emitting device is connected to a negative power line.

The negative power line is used to transmit a negative power signal VSS.

The pixel circuit may further include an induction transistor T3, one of a source or a drain of the induction transistor T3 is connected to the source of the driving transistor T1, the other of the source or the drain of the induction transistor T3 is connected to a sensing line, and a gate of the induction transistor T3 is connected to a readout control line. The readout control line is used to transmit a scanning signal RD.

The pixel circuit may further include a first switch K2, a first end of the first switch K2 is connected to the sensing line, a second end of the first switch K2 is connected to a reference voltage line, and a control end of the first switch K2 is connected to a sensing control line. The reference voltage line is used to transmit a reference signal Vref. The sensing control line is used to transmit a sensing control signal SEN-PRE.

The pixel circuit may further include a second switch K1, a first end of the second switch K1 is connected to the sensing line, a second end of the second switch K1 is connected to an input end of an analog-to-digital converter ADC, and a control end of the second switch K1 is connected to a sampling control line. The sampling control line is used to transmit a sampling control signal SAMP.

When the first switch K2 and the induction transistor T3 are both in the on state, the reference signal Vref can reset the source potential of the driving transistor T1. When the second switch K1 and the induction transistor T3 are both in the on state, the analog-to-digital converter ADC can output the obtained source potential of the driving transistor T1 to a data driver, and then the data driver can provide the corresponding data signal data to the data line.

Figure 4:
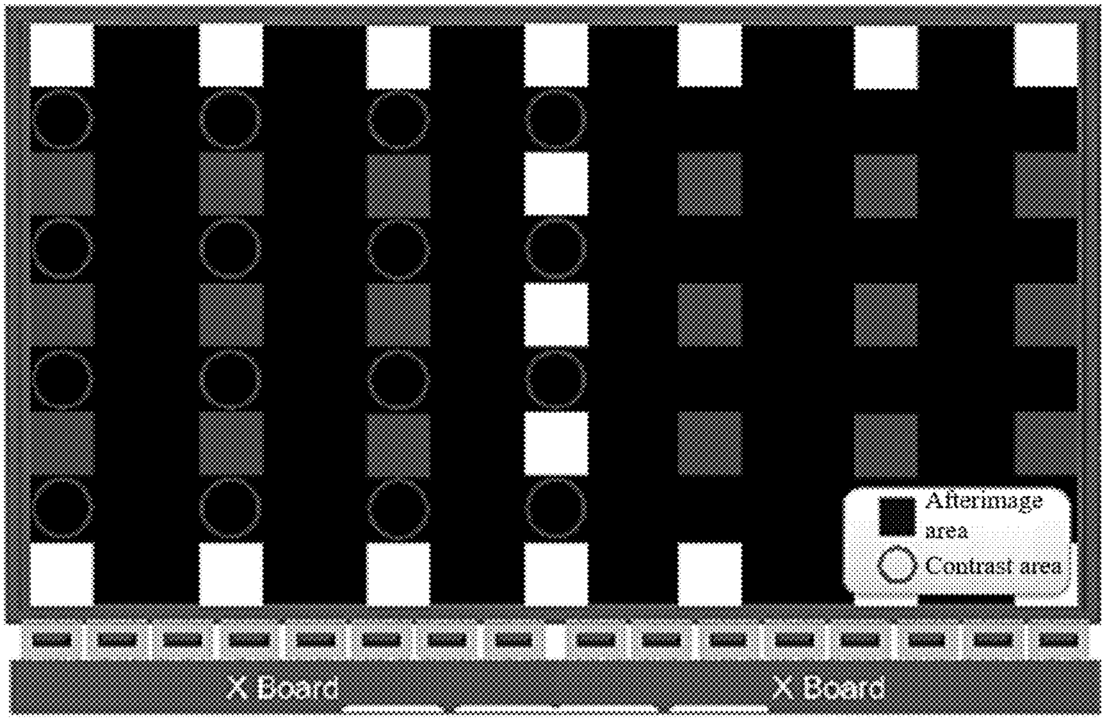
FIG. 4 illustrates a schematic structural view of a display panel according to an embodiment of the present disclosure.

It should be noted that, due to long-term high-temperature aging, the threshold voltage Vth of the driving transistor T1 is shifted in a fixed position in the display panel as shown in FIG. 4 (an afterimage area where rectangular boxes are located as shown in FIG. 4), and the afterimage still visible is generated due to the incomplete compensation caused by the Vgs voltage loss after the Vth compensation. Then, the Vgs@write of each pixel circuit is multiplied by the compensation coefficient α, the brightness difference between the afterimage area and the surrounding contrast area (circular area as shown in FIG. 4) is adjusted at different grayscales. When there is no brightness difference, the compensation coefficient α can be determined at this time to achieve the desired loss compensation effect.

In one embodiment, the step of determining a light-emitting current flowing through the driving transistor T1 in a light-emitting stage based on the compensation coefficient α, the gate potential and the source potential of the driving transistor T1 in the writing stage includes determining a gate-source potential difference of the driving transistor T1 in the writing stage according to a difference between the gate potential of and the source potential of the driving transistor T1 in the writing stage; and determining a gate-source potential difference of the driving transistor T1 in the light-emitting stage based on a product of the compensation coefficient α and the gate-source potential difference of the driving transistor T1 in the writing stage.

It should be noted that in this embodiment, the product of the compensation coefficient α and the gate-source potential difference of the driving transistor T1 in the writing stage is used as the gate-source potential difference of the driving transistor T1 in the light-emitting stage. Compared with using the gate-source potential difference of the driving transistor T1 in the writing stage as the gate-source potential difference of the driving transistor T1 in the light-emitting stage, the brightness shift caused by the transmission loss of the data signal data can be compensated, so as to obtain the desired brightness display.

In one embodiment, the step of determining a light-emitting current flowing through the driving transistor in a light-emitting stage based on the compensation coefficient α and the gate potential and the source potential of the driving transistor T1 in the writing stage further includes: determining a constant of the driving transistor T1; acquiring a calculation result of a square of a difference between the gate-source potential difference of the driving transistor T1 in the light-emitting stage and a threshold voltage of the driving transistor T1; and determining a multiplication result of multiplying the calculation result and the constant of the driving transistor T1 as the light-emitting current that flows through the driving transistor T1 in the light-emitting stage.

It should be noted that the constant of the driving transistor 11 is $$K = \frac{1}{2} * \mu_n * COX * \frac{W}{L},$$

which is related to the process and driving design, where un represents a carrier mobility of the driving transistor T1, COX represents a gate capacitance of the driving transistor T1, and W/L represents a width-length ratio of the driving transistor T1.

The formula for calculating the light-emitting current $I_{ds(emission)}$ flowing through the driving transistor T1 in the light-emitting stage is represented as follows:

$$I_{ds(emission)} = K * (\alpha * V_{gs(write)} - Vth)^2,$$

where Vth represents the threshold voltage of the driving transistor T1; α represents the compensation coefficient; $V_{gs(write)}$ represents the gate-source potential difference of the driving transistor T1 in the writing stage; and $\alpha * V_{gs(write)}$ is the gate-source potential difference of the driving transistor T1 in the light-emitting stage.

Figure 5:
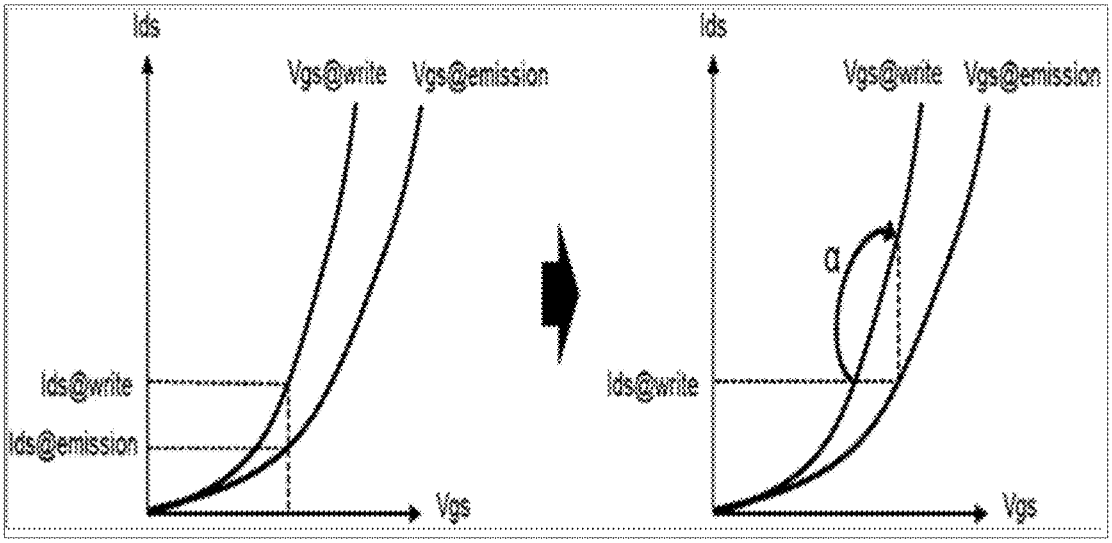
FIG. 5 illustrates a schematic view of a compensation coefficient according to the embodiment of the present disclosure.

It should be noted that, as shown in FIG. 5, Ids represents the light-emitting current flowing through the driving transistor T1, Vgs represents the gate-source potential difference of the driving transistor T1, Ids@write represents the light-emitting current flowing through the driving transistor T1 in the writing stage, Ids@emission represents the light-emitting current flowing through the driving transistor T1 in the light-emitting stage, Vgs@write represents the gate-source potential difference of the driving transistor T1 in the writing stage, and Vgs@emission represents the gate-source potential difference in the light-emitting stage.

The left portion in FIG. 5 is the relationship curve between Ids-Vgs unprocessed by the compensation coefficient α. It can be seen that there is a great difference between Ids@write and Ids@emission when Vgs@write and Vgs@emission are the same. The right portion in FIG. 5 is the relationship curve between Ids-Vgs processed by the compensation coefficient α. It can be seen that after Vgs@write is compensated by the compensation coefficient α, Vgs@write and Vgs@emission can generate the same Ids@write/Ids@emission, so that the desired light-emitting current can be obtained.

Specifically, for Vgs@write and Vgs@emission of the pixel circuit, Ids-Vgs curves are different due to the voltage loss of Vgs. When writing a Vgs@write, the ideal current Ids@write should be generated, while the actual effective voltage is Vgs@emission, and the corresponding current is Ids@emission. The deviation of current leads to low gray scale display and poor compensation effect.

The relationship between Vgs@write and Vgs@emission can be measured through the above-mentioned afterimage experiment, and the desired compensation coefficient α can be obtained when the current corresponding to Vgs@emission is Ids@write.

In one embodiment, the step of determining a compensation coefficient α of the pixel circuit includes: acquiring a gate-source potential difference between the gate potential and the source potential of the driving transistor T1 in the writing stage under different grayscale voltages; determining the grayscale coefficient based on the gate-source potential difference under the different grayscale voltages; and determining the grayscale coefficient as one of factors of the compensation coefficient α.

It should be noted that the grayscale coefficient in this embodiment takes into account the influence of the grayscale voltage, that is, the potential of the data signal data in the writing stage, on the compensation coefficient α, which can further improve the compensation effect of the transmission loss of the data signal data.

In one embodiment, the step of determining a grayscale coefficient based on the gate-source potential difference under the different grayscale voltages further includes: determining a functional relationship between the grayscale coefficient and the gate-source potential difference in the writing stage according to a corresponding relationship between the gate-source potential difference in the writing stage and the light-emitting current flowing through the driving transistor T1 in the light-emitting stage before compensation; and determining the grayscale coefficient according to the functional relationship and the gate-source potential difference in the writing stage.

It should be noted that this embodiment can determine that the grayscale coefficient/compensation coefficient α is a function of the gate-source potential difference in the writing stage, that is, α=f(Vgs@write).

In one embodiment, the step of determining a compensation coefficient α of the pixel circuit further includes: determining row and column coordinates of the pixel circuit in the display panel; determining a position coefficient of the pixel circuit based on the row and column coordinates; and determining the position coefficient as one of the factors of compensation coefficient α.

It should be noted that due to the difference in the physical distance from each pixel circuit to the output source of the data signal data, it will lead to different transmission losses of the data signal data to each pixel circuit. Therefore, the compensation effect caused by transmission losses can be further improved by using the position coefficient as one of the factors of the compensation coefficient α.

In one embodiment, the step of determining a compensation coefficient α of the pixel circuit further includes determining a product of the position coefficient and the grayscale coefficient as the compensation coefficient α.

It should be noted that determining the product of the position coefficient and the grayscale coefficient as the compensation coefficient α can comprehensively consider the influence of the position of the pixel circuit and the potential of the data signal data in the writing stage on the transmission loss, and the compensation effect can be further improved.

In one embodiment, the compensation method further includes the following steps: obtaining a grayscale coefficient table at each grayscale voltage according to the grayscale coefficients of each pixel circuit under different grayscale voltages; and in response to corresponding grayscale voltages, calling, by each pixel circuit, the grayscale coefficient table associated with the corresponding grayscale voltages.

It should be noted that the grayscale coefficient table can collect the grayscale coefficient of each pixel circuit under the same gray-scale voltage and call the grayscale coefficient simultaneously, which improves the calling efficiency and further improves the timeliness of compensation.

In one embodiment, the compensation method further includes: obtaining a position coefficient table according to the position coefficient of each pixel circuit; and calling, by each pixel circuit, the position coefficient table in response to operation of each pixel circuit.

It should be noted that the position coefficient table can collect the position coefficient of each pixel circuit at different positions and call the position coefficient simultaneously, which improves the calling efficiency and further improves the timeliness of compensation.

In an embodiment, this embodiment provides a display panel that implements the compensation method in at least one of the embodiments.

It can be understood that since the display panel provided by this embodiment implements the compensation method in at least one of the above embodiments. Similarly, the gate potential and the source potential of the driving transistor T1 in the writing stage are obtained and the compensation coefficient α of the pixel circuit is determined, and then the light-emitting current flowing through the driving transistor T1 in the light-emitting stage is determined based on the compensation coefficient α, the gate potential and the source potential of the driving transistor T1 in the writing stage. The compensation coefficient α can adjust transmission loss of the gate potential and the source potential of the driving transistor T1 in the writing stage, so as to ensure that the light-emitting current flowing through the driving transistor T1 in the light-emitting stage is desired, without causing the phenomenon of shift in brightness.

It should be noted that the display panel can be a self-luminous display panel, such as an organic light-emitting diode display panel, a micro light-emitting diode display panel, a mini light-emitting diode display panel, or a quantum dot light-emitting diode display panel.

In the above-mentioned embodiments, the description of each embodiment has its own focus, and parts of an embodiment that are not described in detail can be found in the relevant descriptions of other embodiments.

The compensation method of the pixel circuit and the display panel provided by the embodiments of the present disclosure are described in detail above. In this paper, the principle and implementation of the present disclosure are described by using specific examples, and the description of the above embodiments is only used to help understand the technical solutions and the core idea of the present disclosure. Those skilled in the art should understand that the technical solutions described in the foregoing embodiments can still be modified, or some of the technical features thereof can be equivalently replaced, and such modifications or replacements do not cause the essence of the corresponding technical solutions to deviate from the scope of the technical solutions of the embodiments of the present disclosure.

What is claimed is:

1. A compensation method of a pixel circuit, comprising following steps:
constructing the pixel circuit comprising a driving transistor;
acquiring a gate potential and a source potential of the driving transistor in a writing stage;
determining a compensation coefficient of the pixel circuit; and
determining a light-emitting current flowing through the driving transistor in a light-emitting stage based on the compensation coefficient and the gate potential and the source potential of the driving transistor in the writing stage, wherein in the step of determining the light-emitting current flowing through the driving transistor in the light-emitting stage based on the compensation coefficient and the gate potential and the source potential of the driving transistor in the writing stage comprises:

determining a gate-source potential difference of the driving transistor in the writing stage based on a difference between the gate potential and the source potential of the driving transistor in the writing stage, and determining a gate-source potential difference of the driving transistor in the light-emitting stage based on a product of the compensation coefficient and the gate-source potential difference of the driving transistor in the writing stage.

2. The compensation method according to claim 1, wherein the step of determining the light-emitting current flowing through the driving transistor in a light-emitting stage based on the compensation coefficient and the gate potential and the source potential of the driving transistor in the writing stage further comprises:

determining a constant of the driving transistor;

acquiring a calculation result of a square of a difference between the gate-source potential difference of the driving transistor in the light-emitting stage and a threshold voltage of the driving transistor; and determining a multiplication result of multiplying the calculation result and the constant of the driving transistor as the light-emitting current that flows through the driving transistor in the light-emitting stage.

3. The compensation method according to claim 1, wherein the step of determining the compensation coefficient of the pixel circuit comprises:

acquiring a gate-source potential difference between the gate potential and the source potential of the driving transistor in the writing stage under different grayscale voltages;

determining grayscale coefficients based on the gate-source potential difference under different grayscale voltages; and determining the grayscale coefficient as one of factors of the compensation coefficient.

4. The compensation method according to claim 3, wherein the step of determining the grayscale coefficient based on the gate-source potential difference under the different gray scale voltages further comprises:

determining a functional relationship between the grayscale coefficient and the gate-source potential difference in the writing stage according to a corresponding relationship between the gate-source potential difference in the writing stage and the light-emitting current that flows through the driving transistor in the light-emitting stage before compensation; and determining the grayscale coefficient according to the functional relationship and the gate-source potential difference in the writing stage.

5. The compensation method according to claim 3, wherein the step of determining the compensation coefficient of the pixel circuit further comprises:

determining row and column coordinates of the pixel circuit in a display panel;

determining a position coefficient of the pixel circuit based on the row and column coordinates; and determining the position coefficient as one of the factors of the compensation coefficient.

6. The compensation method according to claim 5, wherein the step of determining the compensation coefficient of the pixel circuit further comprises:

determining a product of the position coefficient and the grayscale coefficient as the compensation coefficient.

7. The compensation method according to claim 6, further comprising:

obtaining a grayscale coefficient table for each grayscale voltage according to the grayscale coefficients of each pixel circuit under different grayscale voltages; and in response to the corresponding grayscale voltage, calling, by each pixel circuit, the gray scale coefficient table associated with the corresponding grayscale voltage.

8. The compensation method according to claim 7, further comprising:

obtaining a position coefficient table according to the position coefficient of each pixel circuit; and calling, by each pixel circuit, the position coefficient table in response to an operation of each pixel circuit.

* * * * *